United States Patent [19]
Kobayashi et al.

[11] 3,875,532
[45] Apr. 1, 1975

[54] SEMICONDUCTOR LASER DEVICE HAVING A LIGHT FOCUSING TRANSMISSION

[75] Inventors: Kohroh Kobayashi; Atsufumi Ueki, both of Tokyo, Japan

[73] Assignee: Nippon Selfoc Company, Limited, Tokyo, Japan

[22] Filed: Dec. 26, 1973

[21] Appl. No.: 428,054

[30] Foreign Application Priority Data
Dec. 29, 1972  Japan.................................. 47-1841
Jan. 18, 1973  Japan.................................. 48-8337

[52] U.S. Cl. 331/94.5 H, 331/94.5 C, 350/179 GN, 357/18
[51] Int. Cl. ............................................. G02f 3/00
[58] Field of Search ................. 331/94.5 H, 94.5 C; 350/175 GN; 357/18

[56] References Cited
UNITED STATES PATENTS
3,729,253  4/1973  Moore et al. ................. 350/175 GN
3,790,902  2/1974  Miller ........................... 331/94.5 H
3,825,856  7/1974  Pezot ............................ 331/94.5 C
3,838,358  9/1974  Vanderleeden ................ 331/94.5 C

*Primary Examiner*—Edward S. Bauer
*Attorney, Agent, or Firm*—Hopgood, Calimafde, Kalil, Blaustein & Lieberman

[57] ABSTRACT

A semiconductor laser device includes a laser element and a light transmission body mounted in an integrated structure. The light transmission body is mounted coaxially with the axis of the active region of the laser element and includes a focusing portion arranged about the axis of the body. The refractive index distribution in the focusing portion of the light transmission body is chosen so as to minimize undesired oscillation modes in the output light beam and to provide an output beam of substantially circular cross section.

18 Claims, 25 Drawing Figures

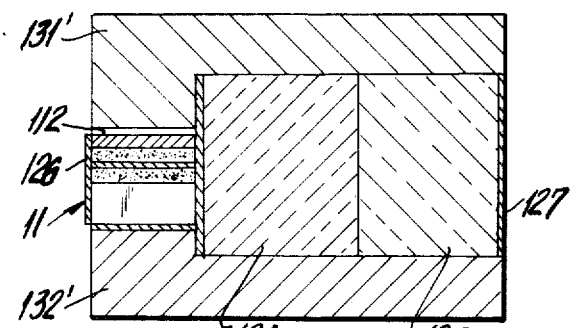
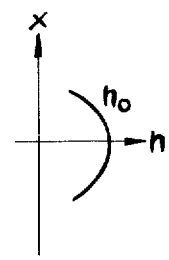
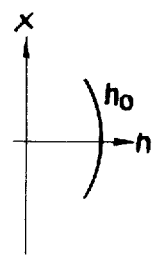
FIG.8a    FIG.8c    FIG.8e
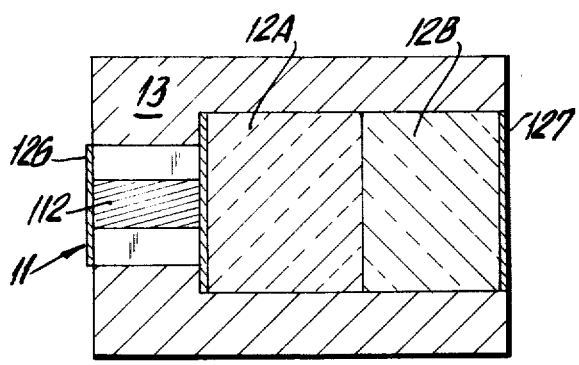
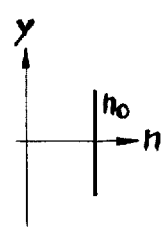
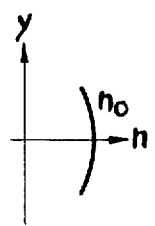
FIG.8b    FIG.8d    FIG.8f
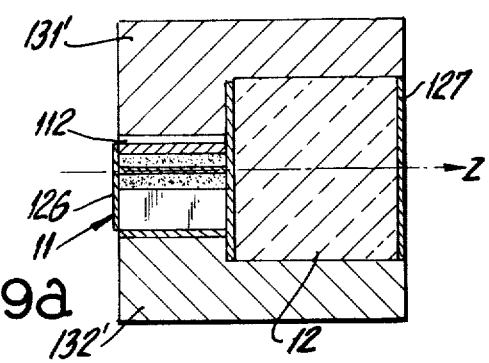
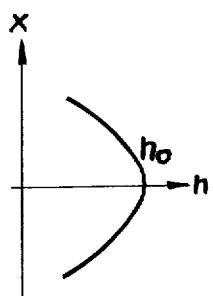
FIG.9a    FIG.9c
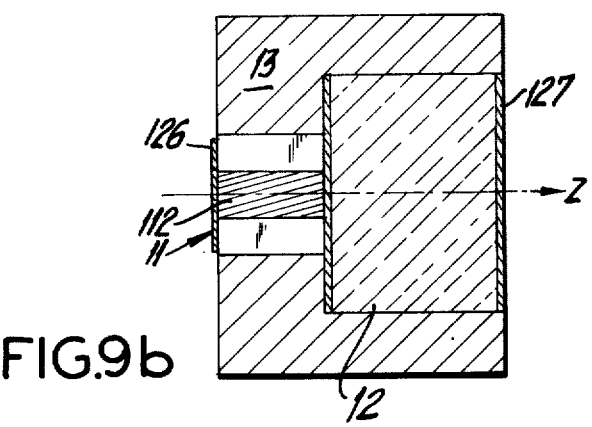
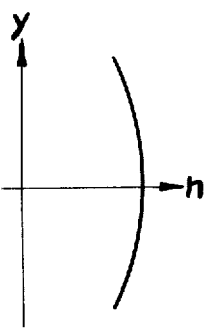
FIG.9b    FIG.9d

SEMICONDUCTOR LASER DEVICE HAVING A LIGHT FOCUSING TRANSMISSION

BACKGROUND OF THE INVENTION

The present invention relates to a semiconductor laser device and, more particularly, to such a device having a small-sized light transmission body, which includes a focusing portion having a refractive index distribution gradient in at least a plane normal to the optical axis of the transmission body which restricts the laser osciallation of the device to a limited transverse mode so as to increase the coupling efficiency between the laser device and an external utilization device.

The development of the GaAlAs—GaAs double hetero structure laser diode has brightened the future prospects of the practical utilization of miniaturized coherent continuous-wave light sources. However, several problems must still be solved.

To increase the coherency of the emitted light and the efficiency of a semiconductor laser, the laser oscillation must be restricted to a low order transverse mode, and preferably to the lowest order single mode. In a prior art technique to meet this requirement the thickness of the $p\text{-}n$ junction of the semi-conductor laser is determined so as to make the active region of the laser as thin as 0.5 to 1 micron. By suitably choosing the width of the excitation current input electrode the active region may be made as narrow as 10 to 100 microns. By reducing the thickness of the $p\text{-}n$ junction the oscillation mode can be restricted to a fundamental transverse mode since the thickness of the active region is then small enough to prevent the propagation of high order modes. If, however, the active region is as wide as 10 microns or more, the propagation of unnecessary higher order modes will result. Such higher order modes can be precluded by maintaining the oscillation output light power at a low level, such as several milliwatts, but increasing the light power output above this low level inevitably involves undesired higher order modes, so that high power output cannot be achieved for coherent light beams.

If the thickness of the active region is reduced further to obtain oscillation restricted to the fundamental transverse mode, the laser light diffraction at the output end of the active region is increased causing a decrease in the efficiency of the coupling between the laser device and external laser utilization devices.

Another prior art approach to this problem is the use of an external resonator to restrict the oscillation to the fundamental transverse mode without resorting to a reduction in the thickness and/or width of the active region, so that the laser output power level need not be decreased. This approach is disclosed in ("Applied Optics," Vol. 8, No. 9, September issue, 1969, pp. 1859 – 1865; and "IEEE Journal of Quantum Electronics," Vol. QE-8, No. 7, July issue, 1972, pp. 632 – 641). In a structure of this type the external resonator may include concave mirrors and/or a lens. The resonator serves to covnerge the light beam emanating from the active region, thereby eliminating undesired oscillation modes. Laser light diffraction can also be reduced by the lens and/or reflecting mirrors of the resonator. Thus, the efficiency of coupling between the laser device and the utilization device is improved.

In practice, however, the laser beam emanating from the very thin, wide active region of the laser is not isotropic when viewed in a plane normal to its axis and hence it is difficult to realize the desired convergence of light beams by the use of convex lens and concave mirrors arranged to form an optical resonator. To increase the efficiency of light beam convergence, the lens and/or the concave mirrors must be located as close to the end of the active region, i.e., the end of the semiconductor element as possible. For this purpose, the focal length of the lens or mirror must be made as small as possible. However, the focal length of lens or mirrors formed by conventional polishing processes have a lower limit and as that limit is approached strong spherical aberration results. Furthermore, no way is known to miniaturize this type of optical system to a size small enough to be conveniently integrated with a semiconductor laser element. This problem has hampered the miniaturization of semiconductor laser devices. It is also difficult to align the semiconductor laser element with a resonator comprising discrete lens and/or spherical mirrors. In addition, high mechanical stability is hard to maintain in an optical resonator of this type. Lack of stability becomes an acute problem when a semiconductor laser element must be replaced, and the entire device must be subjected to readjustments including axial realignment.

Accordingly, it is an object of the present invention to provide a semiconductor laser device in which oscillation is restricted to the lowest mode, comprising a miniaturized external resonator constructed integrally with a semiconductor laser element, thus obviating the need for adjusting the axial alignment between the resonator and the laser element.

Another object of the invention is to provide a semiconductor laser device capable of generating coherent light beams at usable power levels.

Still another object of the invention is to provide a semiconductor laser device which can be effectively coupled with a laser application device.

A further object of the invention is to provide a miniaturized semiconductor laser device capable of generating an output beam of circular cross section.

SUMMARY OF THE INVENTION

A laser device for generating a light beam of predetermined cross section along a given path includes an elongated semiconductor element having a first and a second opposed end surfaces and a longitudinally arranged laser active region extending between the end surfaces, the cross section of the active region being elongated in a given direction and said region having a substantially central axis. A first light reflector is disposed on the first end surface of the laser element in the path of said light beam. At least one light transmission body has an axis which is collinear with the axis of the laser active region. A first end surface of the light transmission body is adjacent to the laser element and a second end surface of the light transmission body has a second reflector disposed thereon in the path of the light beam so that the light beam is reflected back and forth between the two reflectors. A predetermined portion of the light transmission body comprises a light focusing member arranged about the axis of the transmission body. The light focusing member has a refractive index which decreases in a manner which is approximately proportional to the square of the distance from the axis in at least that direction which is perpendicular the direction of elongation of the cross section of the active region of the laser element. Mounting means are provided to hold the laser element and the light transmission body in an integrated structure.

DESCRIPTION OF THE DRAWINGS

The above and other objects, features and advantages of the invention will become more apparent from the following detailed description taken in conjunction with the accompanying drawings, in which:

FIG. 2b is a partially cut away perspective view of the device of FIG. 2a;

FIGS. 7c and 7d show the refractive index distribution of the device of the fifth embodiment along the planes of FIGS. 7a and 7b;

FIGS. 8a and 8b are sectional views taken along two perpendicular axial planes of a sixth embodiment of the invention;

FIGS. 8c through 8f show refractive index distribution of the device of the sixth embodiment along the planes of FIGS. 8a and 8b.

FIGS. 9a and 9b are sectional views taken along two perpendicular axial planes showing a seventh embodiment of the invention; and FIGS. 9c and 9d show the refractive index distribution of the seventh embodiment along the planes of FIGS. 9a and 9b.

DESCRIPTION OF THE INVENTION

Figure 1A:
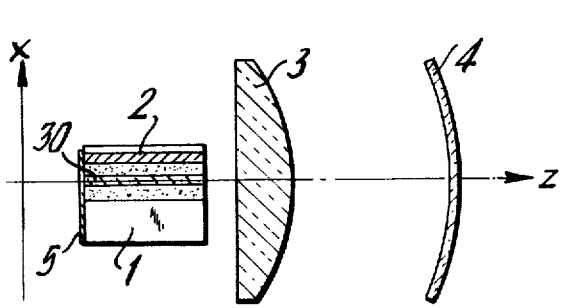
FIG. 1a and 1b are cross sectional view of prior art semiconductor laser devices having discrete elements.
Figure 1B:
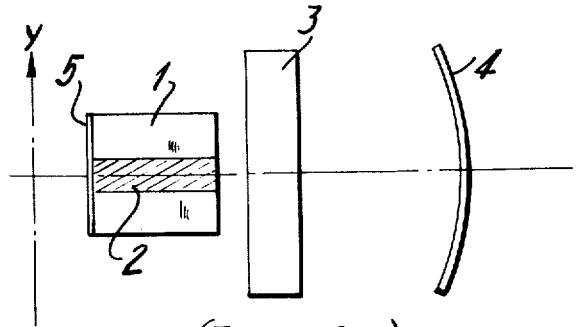

In FIGS. 1a and b schematically show a prior art semiconductor laser device of the type having a separate external mirror. FIG. 1a shows a cross sectional view of the device taken along a plane perpendicular to the p-n junction of the semiconductor laser element, and FIG. 1b shows a plan view of the device taken in a plane parallel with the p-n junction. A cylindrical lens is used to convert the relatively flat beam of light emitted from the active region into a beam of circular cross section.

The semiconductor laser element includes a semiconductor laser diode 1 having a stripe-geometry electrode 2, and a lens 3 having a curvature only in a plane normal to the p-n junction. The optical resonator includes a mirror 4 having two reflective surfaces and a reflective film 5 which is formed on one end of the diode 1. The light emitting portion of the output end of the diode 1 is a rectangular in shape and extremely thin in the direction perpendicular to the diode p-n junction 30. As a result of this configuration the output light beam tends to be diffracted much more in the direction perpendicular to the junction 30 than in the direction parallel thereto. Thus, if the output light beams are converged by the cylindrical lens 3 only in the direction perpendicular to the junction plane, the cross section of the resultant beam will become nearly circular. The circular beams from the diode 1 can be combined together in the optical resonator made up of the lens 3, the spherical mirror 4 and the reflective surface 5 which is arranged at one end of the diode 1. To effectively combine the output light beams from the diode 1 and to make the resulting output beam nearly circular in cross section, the focal length of the cylindrical lens 3 is made small and the focal plane of the lens is arranged to be coincident with the output end of the semiconductor laser element 1. However, this conventional device involves many difficulties one of which is the need for providing a lens of sufficiently short focal length by conventional polishing techniques. Such a lens will include significant spherical aberration, which will cause low light-convergence efficieny. The use of a lens which is physically combined with the laser diode will solve this problem. But this arrangement necessitates an intricate and difficult production process and requires a large space which causes increased loss in the optical resonator. Because the surface of the lens 3 is curved, it is difficult to integrate the diode 1, lens 3 and spherical mirror 4 into a unitary structure. For the above reasons semiconductor laser devices of this type are not practically feasible.

The present invention eliminates the above drawbacks found in the prior art devices by the use of a light-focusing transmission body having a predetermined refractive index distribution without the need for a discrete cylindrical lens formed by a polishing process.

Figure 2A:
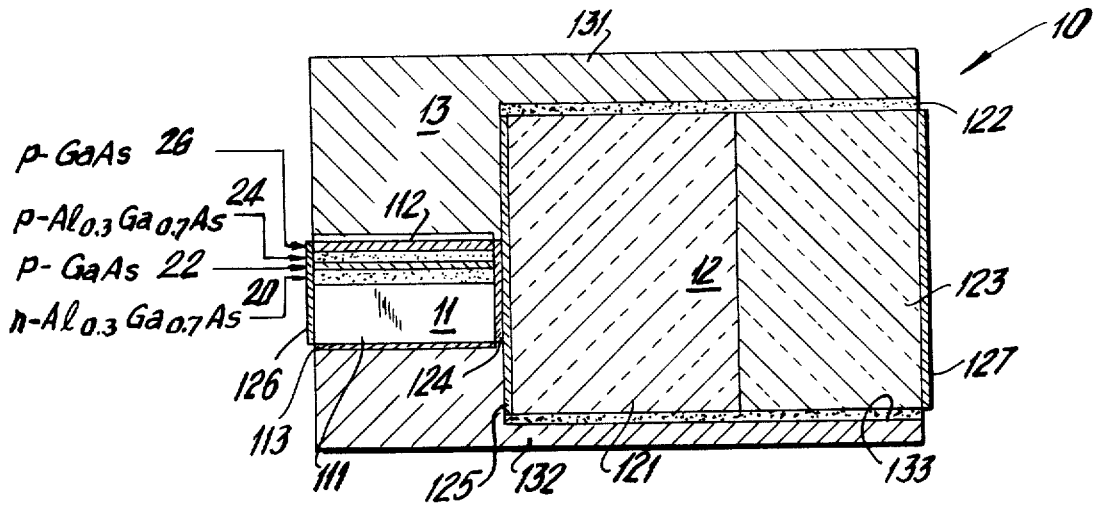
FIG. 2a is an axial sectional view of a first embodiment of the invention.
Figure 2B:
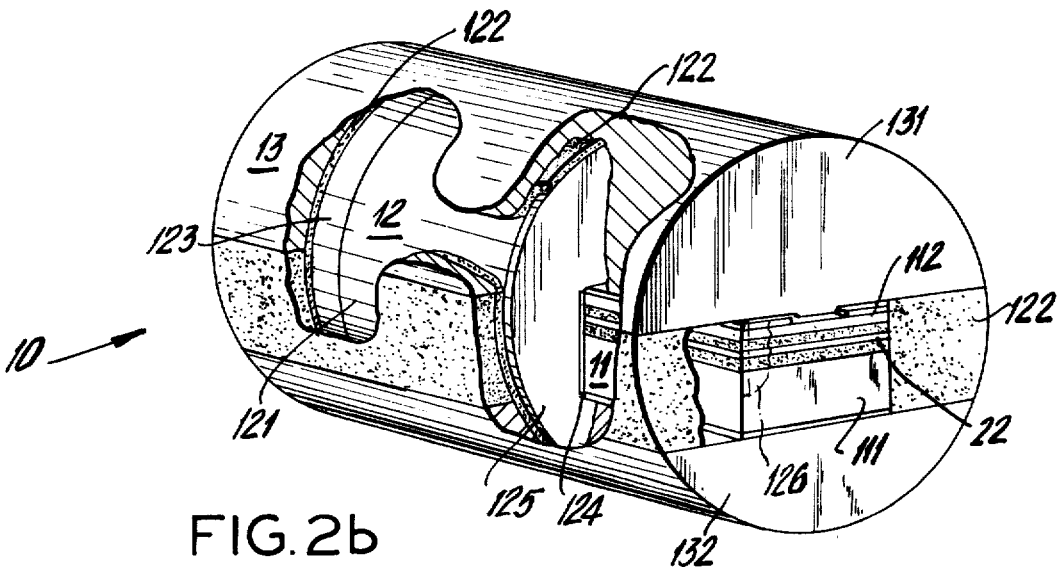

Referring to the first embodiment of the invention as shown in FIGS. 2a and 2b, a semiconductor laser device 10, comprises a semiconductor laser element 11, a light transmission body 12, which includes a light focusing member 121 and an optically transparent body 123, and an electrode and heat sinking member 13 all of which are integrally combined in the manner to be described below.

The semiconductor laser element 11, is similar to that shown as 1 in FIG. 1. Laser element 11 comprises an $n$ type $Al_{0.3}Ga_{0.7}As$ layer 20 which is epitaxially formed on a GaAs substrate 111, a $p$ type GaAs layer 22 formed on the layer 20 and constituting an active region, a $p$ type $Al_{0.3}Ga_{0.7}As$ layer 24 formed on the layer 22 and a second $p$ type GaAs layer 26 formed on the layer 24. A stripe-geometry ohmic electrode 112 is formed on the second $p$ type GaAs layer 26. A second ohmic electrode 113 is formed on the bottom surfaces of the substrate 111. These electrodes 112 and 113 are soldered to a positive electrode 131 and a negative electrode piece 132, respectively, which make up the electrode/heat-sinking member 13.

As shown in FIG. 2b, the electrodes 131 and 132 are configured so that they support the laser element 11 and assume an external cylindrical shape as a whole. A cylindrical cavity 133 as best seen in FIG. 2a is formed in member 13. The light transmission body 12 is mounted in cavity 133. The light transmission body 12 includes a focusing light transmission body 121 and an ordinary light transmission body 123. The focusing light transmission body 121 is mounted so that the optic axis of the body is collinear with the axis of the active region 22 of the laser element 11 and the body 121 is fastened in the cavity 133 with epoxy resin 122. The ordinary optically transparent cylindrical glass body 123 which is similar to the light transmission body 121 is inserted into cavity 133 so that its axis is aligned with the axis of the focusing light transmission body 121 and is also fastened with epoxy resin 122. Antireflection films 124 and 125 are disposed in the space between the laser element 11 and the focusing light transmission body 121 to minimize reflection loss. The outer end surface of the laser element portion 11 and that of the cylindrical glass body 123 are lapped to a mirror-like finish and covered with reflection films 126 and 127 respectively. These reflective films 126 and 127, together with the light transmission body 12, constitute an optical resonator. The reflectivity of the film 127 is determined to be approximately 80% to allow the transmitting light component to merge as a coherent light output which is supplied to an external laser application device.

The focusing light transmission body 121 has in a cross-sectional plane perpendicular to its central axis a refractive index distribution which decreases from the central axis of the body 121 outward toward the surface at a rate nearly proportional to the square of the distance from the central axis. More specifically, the refractive index $n(x)$ at a point a distance $x$ from the axis of the body is given as $$n(x) = n_0(1 - \tfrac{1}{2} ax^2) \quad (1)$$

where $n_0$ stands for a refractive index at the axis; and $a$ is a constant representing the gradient in the refractive index distribution. The light focusing transmission body 121 functions as a lens having its optical axis oriented in the axial direction of the body. Thus, $$f = 1/(n_0 \ \sqrt{a} \sin L \ \sqrt{a}) \quad (2)$$

$$h = (1 - \cos L \ \sqrt{a})/(n_0 \ \sqrt{a} \sin L \ \sqrt{a}) \quad (3)$$

where $L$ stands for the length of the focusing light transmission body 121; $f$, its focal length; and $h$, a distance from the end surface of the light focusing transmission body 121 to the principal plane in the body.

The reduction leading to Eqs. (2) and (3) and the definition of the principal plane of the body are described in "Bell System Technical Journal" by H. Kogelnik, Vol. 44, March, 1965, pp. 455-494.

In the above example, $a = 0.55$mm$^{-2}$ and $L = 2.11$mm to satisfy condition $L \ \sqrt{a} = \pi/2$ for the light focusing transmission body 121. In this case, the focal length $f$ is 0.86 mm. This small focal length can be easily realized in a light-focusing transmission body 121 made by an ion-exchange method, while it can never be realized in a conventional lens made by polishing. The length of the cylindrical glass body 123 is 1.6 mm in the axial direction in this example. This cylindrical glass body 123 is used so as to satisfy the condition necessary for the stability of the optical resonator comprising the reflection films 126 and 127 and the light-focusing transmission body 121. To facilitate the handling of the laser device, the length of the heat-sinking electrode member 13 is determined so that its circular ends are flush respectively with the outer ends of the semiconductor laser element portion 11 and cylindrical glass body 123.

In operation, the eigen mode spot size of the laser output light looking in the direction parallel with the plane of the active layer in the outer end 126 of the laser element portion 11 is 8 microns, while the spot size in the reflection film 127 on the opposite end of the device is 30 microns. When the width of the stripe electrode 112 is about 25 microns, so that it is about 3 times as large as the eigen mode spot size of the output light, higher order transverse oscillation modes are substantially restricted and a coherent light beam having a power output of about 50 milliwatts can be obtained.

Because the spot size of the output light at the reflection film 127 is large as mentioned above, the angle of divergence in the direction parallel with the plane of the active layer can be limited to approximately 0.5°. When the thickness of the active layer is determined to be about 0.6 micron, the angle of divergence in the direction perpendicular to the plane of the active layer can be limited to about 5°, as opposed to such wide divergence as 60° which could result without the optical resonator.

Because the stripe electrode 112 is made narrow, and because the undesired oscillation modes in the direction parallel with the plane of the active layer can be restricted as mentioned above, the invention enables the device to provide an oscillation output which is almost solely in the fundamental transverse mode and has a very small angle of divergence as a whole.

According to the invention, electrodes which are not shown, and are used for supplying exciting power to laser element 11 may be installed in close contact with the positive and negative electrode members 131 and 132 on the side where the laser element device is mounted. This will facilitate the replacement of parts if trouble develops in the semiconductor laser device.

According to the invention, all elements constituting the device are integrated into a single unit, thereby providing good mechanical stability.

Figure 3:
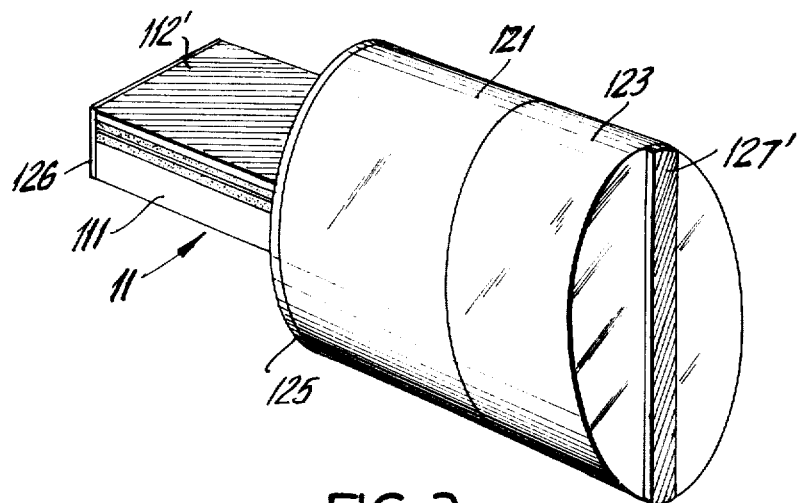
FIG. 3 is a perspective view of a second embodiment of the invention.

Reference is now made to FIG. 3, which shows a perspective view of a second embodiment of the invention. Like constituent elements are indicated by the same reference numerals used in FIGS. 2a and 2b. Electrode members 131 and 132 are omitted from FIG. 3 for simplicity.

Instead of the stripe electrode 112 shown in FIGS. 2a and 2b which was used as a means for limiting the width of the active region in the laser element portion 11, this second embodiment employs an ohmic layer 112' which is formed on the entire top surface of the uppermost p-GaAs epitaxial layer. Also, instead of the film coating used as the reflection film on the outer circular end of the cylindrical glass body 123, a single strip of reflecting film 127' is arranged on the end of glass body 123 perpendicular to the plane of the active layer of the laser element portion 11.

The eigen mode spot size in the direction parallel with the plane of the active layer of the resonator used in this embodiment is about 30 microns at the reflection film 127'. Higher order transverse oscillation modes are limited by the stripe-geometry reflection film 127' which is 100 microns wide, or about 3 times the eigen mode spot size so that an output in the fundamental transverse mode alone can be obtained. Experimental results show that operation in the fundamental mode was maintained even when the exciting current was increased.

Figure 4:
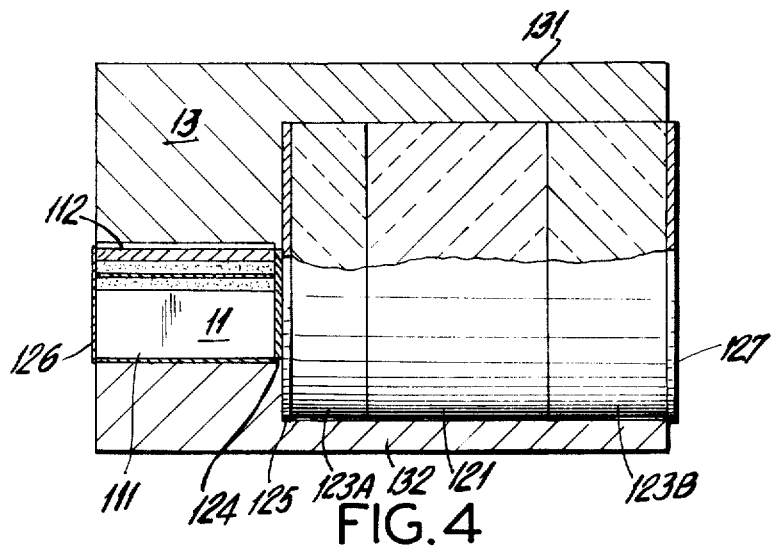
FIG. 4 is an axial sectional view of a third embodiment of the invention.

Referring to FIG. 4, a third embodiment of the invention has a cylindrical glass body 123A inserted between the focusing light transmission body 121 and the laser element 11. This is in contrast to the arrangement of the first embodiment where the light transmission body 121 is brought into direct contact with the laser element 11. Another cylindrical glass body 123B is attached to the other end of the light transmission body 121 and fastened with epoxy resin which is not shown for the sake of simplicity. As in the case of the first embodiment, the length L of the focusing light transmission body 121 is determined to be 1.06 mm, with the result that its focal length $f$ is 1.19 mm calculated as explained above. The lengths of the cylindrical glass bodies 123A and 123B are determined to be 0.84 mm and 2mm, respectively. It has been experimentally confirmed that the device of this embodiment is also capable of effectively suppressing higher order oscillation modes.

In the foregoing first to third embodiments, the focusing transmission body 121 used is of the type having a parabolic refractive index distribution, in which the refractive index decreases nearly in proportion to the square of the distance from the central axis in a plane perpendicular to the axis of the light transmission body 121. In this structure, the active layer of the laser element portion is very thin and rectangular in shape and hence the cross section of the output beam can hardly be made circular. Since some laser utilization devices require an output laser beam of circular cross section and since an output laser beam of circular cross section is desirable in view of the resulting increase in the efficiency of optical coupling between the laser device and the laser application device some means must be provided to approximate the cross section of the laser output beam to a circle. For example, the refractive index of the focusing transmission body 121 may be changed non-symmetrically about the central axis in the cross sectional plane of light transmission by changing the refractive index in only one-dimensional direction. Alternatively, the rate of the change in the refractive index in a given direction may be made larger than the change in the direction perpendicular to the given direction.

Figure 5:
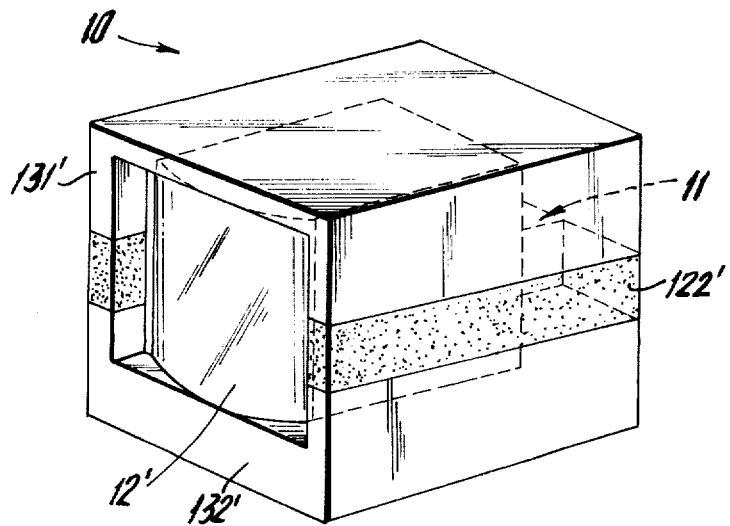
FIG. 5 is a perspective view of a fourth embodiment of the invention.
Figure 6A:
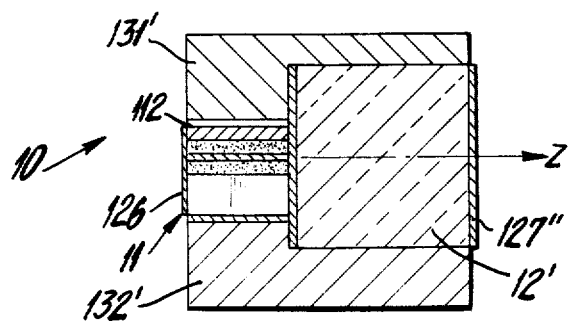
FIG. 6a and 6b are axial sectional views of the device of FIG. 5; taken respectively along the planes A—A and B—B in FIG. 5.

In the following embodiments the focusing portion includes the entire light transmission body. A fourth embodiment of the invention shown schematically in FIG. 5 and FIGS. 6a and 6b is characterized in that the parabolic refractive index distribution of the focusing transmission body 12′ occurs only in the one-dimensional direction, and a cylindrical reflection film 127′ is used on the output side. In FIGS. 5 and 6, like component elements are indicated by the same reference numerals used in prior figures. In this fourth embodiment, a light transmission body 12′ of the parabolic refractive index distribution is used. The epoxy resin portion used to secure the parts of the device is not shown for the sake of simplicity. Symbols X, Y and Z indicating three mutually perpendicular axes through the device of FIG. 5 are used in FIG. 6 in order to describe in more detail the behavior of the distribution of the refractive index of that device. The Z-axis indicates the output direction of the output laser beam of the semiconductor laser device 10. The Y-axis lies in parallel with the active layer in a plane perpendicular to the Z-axis, and X-axis is perpendicular to the Y-axis.

Figure 6C:
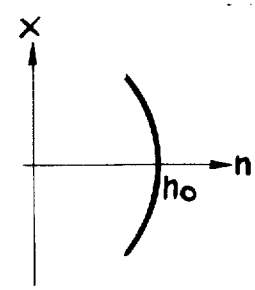
FIG. 6c and 6d show the refractive index distributions plotted about the axis of the device of FIG. 5 in the orientations shown in FIGS. 6a and 6b, respectively.
Figure 6B:
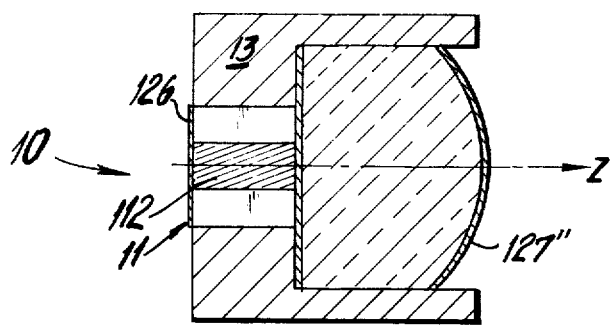
Figure 6D:
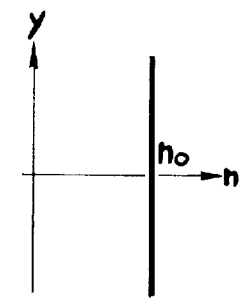

As shown in FIGS. 6c and 6d, the focusing light transmission body 12′ has the parabolic distribution of refractive index in the X-axis direction, while a constant distribution in the Y-axis direction. As in the case of the foregoing focusing light transmission body 12, this focusing light transmission body 12′ may be made of glass material by ion-exchange process. The outer end of the body may be polished to assure the convergence of light along the X-axis direction. In this example, the focusing light transmission body 12′ has a refractive index $n_o$ at the center axis of 1.58 and the refractive index gradient constant a is 0.117 mm$^{-2}$. In this structure, the length of the light transmission body is 4.6 mm and the radius of curvature of its cylilndrical surface is 5 mm. A multilayer film 127″ of about 90% reflectivity dielectric material is formed on its outer polished surface by an evaporation process.

In this fourth embodiment, the eigen mode spot size is about 20 microns on the reflection plane 126 on the side opposite the focusing light transmission body 12′ of the semiconductor laser element 11. Experiments have shown that higher order oscillation modes whose energy distribution is large in the periphery, are limited and that the radiated output in the fundamental mode was obtained when the width of the stripe-geometry electrode 112 was 60 microns, i.e., about 3 times the eigen mode spot size.

Figure 7A:
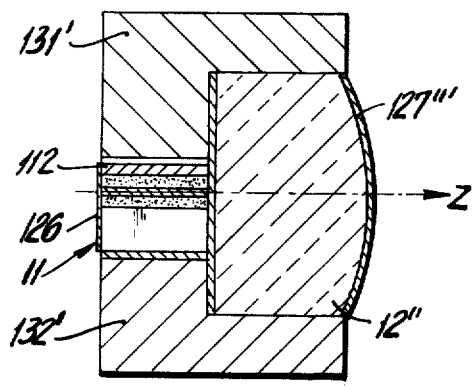
FIGS. 7a and 7b are sectional views taken along two perpendicular axial planes of a fifth embodiment of the invention.
Figure 6C:
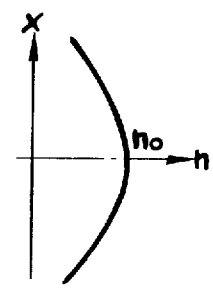
Figure 7B:
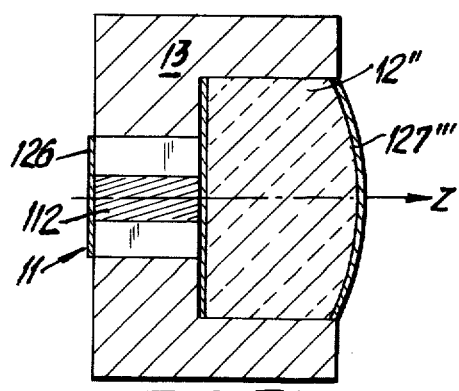

Referring to FIGS. 7a and 7b, a fifth embodiment of the invention is similar to the fourth embodiment, except that the end of the focusing light transmission body 12″ is spherical with the curvature radius R equal to 5 mm. In this example, the length of the light transmission body is determined to be 3.56 mm. Other conditions are similar to those for the fourth embodiment.

Figure 7D:
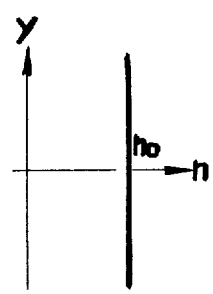

In the fourth and fifth embodiments shown in FIGS. 5 to 7, the change in the refractive index of the focusing light transmission body is effected only in the X-axis direction, and the end of the light transmission body on the side of laser light output end is made cylindrical or spherical to reinforce the light converging effect. In some cases, however, the change in the refractive index should be effected in the direction of Y-axis. This is needed for example, when the shape of the cross section of the laser output beam is to be precisely adjusted. An embodiment adapted to such need will be described below by referring to FIGS. 8 and 9.

In a sixth embodiment shown in FIG. 8, with FIG. 8a showing an axial cross sectional view taken perpendicular to the plane of the active layer, and FIG. 8b an axial cross sectional view taken in parallel with the active layer, two focusing light transmission body members 12A and 12B having different refractive index distributions are disposed with their respective optic axes aligned. The inner light transmission body member 12A has a fairly steep refractive index change in the X-axis direction, and a constant refractive index distribution in the Y-axis direction, as indicated by refractive index distributions in X- and Y-axis directions as shown in FIGS. 8c and 8d. Whereas, the outer light transmission body member 12B has similar refractive index distributions in both X- and Y-axis directions as indicated by 8e and 8f in FIG. 8. In this embodiment, the axial lengths of the light transmission body members 12A and 12B are determined to be 3.10 and 2.14 mm respectively. In this embodiment the entire light transmission body including members 12A and 12B is used for focusing.

Instead of the two light transmission body members, a plurality of light focusing transmission bodies having different refractive index distributions may be used in combination to realize an adequate light convergent characteristic and to approximate the cross section of the output laser beam to a circle and to suppress undesired modes whereby a more efficient laser device is realized.

A seventh embodiment of the invention is schematically shown in FIG. 9 with FIG. 9a showing an axial cross-sectional view taken perpendicular to the active layer, and 9b an axial cross-sectional view taken in parallel with the active layer. In this embodiment, the refractive index gradient of the light transmission body 12 is different in the X- and Y-axis directions. The refractive index distributions thereof are shown in FIGS. 9c and 9d. More specifically, the refractive index distribution of this light transmission body 12 is slightly flat and elliptic in the direction parallel with the active layer plane, and the parameters $a_x$ and $a_y$ which express the refractive index gradients in the X- and Y-axis directions are determined to be 6 mm$^{-2}$ and 0.13 mm$^{-2}$, respectively. The length of the light transmission body is 2.11 mm.

In this embodiment, the spot size of the output light which depends on the light resonator is similar to that in the fourth embodiment. Also the width of the stripe-geometry electrode is determined to be 60 microns as in the previous embodiment.

In the foregoing embodiments, the focusing light transmission body is attached on only one side of the laser diode to form an optical resonator. As is apparent, it may as well be installed on both sides of the semiconductor element part 11, whereby light focusing effect is achieved on both sides. In this structure, the effect of restricting the undesired higher order transverse modes is enhanced.

The focusing light transmission body used in the foregoing embodiments may be formed by ion exchange process in which a glass substrate is placed in fused salt for ion exchange. One practical method of this ion exchange process is described in detail in U.S. patent application Ser. No. 147,256 (which is a continuation of a parent application Ser. No. 806,368, filed Mar. 12, 1964), and hence further description thereof is omitted.

As has been specifically described above, the semiconductor laser device of this invention consists essentially of a laser element portion, a light transmission body portion being part of the optical resonator, and a means serving both as an exciting current supply electrode and as a heat-sinking member. All these constituents are integrated into an integral unit, and at least a portion of the light transmission body is given light focusing characteristic and/or the end of the light transmission body may be curved thereby to generate a relatively high power output laser beam which is substantially confined to the fundamental transverse oscillation mode.

What is claimed is:

1. A laser device for generating a light beam of predetermined cross section along a given path including:
   a semiconductor element having a first and a second opposed end surfaces, said element including a longitudinally extending laser active region extending between said end surfaces, the cross section of said region being elongated in a first direction, and said region having a substantially central axis;
   first reflecting means disposed on said first end surface of said element in the path of said beam;
   a light transmission body having an axis which is collinear with said axis of said laser active region, said transmission body having an inner and an outer opposed surfaces, said inner surface of said body being arranged closer to said laser element than said outer surface of said body;
   said light transmission body including a light focusing portion arranged along said axis of said transmission body, said focusing portion having a refractive index which decreases substantially proportionally to the square of the distance from said axis of said body at least in a direction substantially perpendicular to the direction of elongation of said laser region; and
   second reflecting means disposed on said outer surface of said body.

2. A laser device as claimed in claim 1, including mounting means to hold said light transmission body and said laser element in an integrated structure.

3. A laser device as claimed in claim 2, wherein said mounting means includes an electrode structure for supplying excitation current to said semiconductor laser element.

4. A laser device as claimed in claim 3, wherein said mounting means includes a cylindrical outer wall which is coaxial with said laser region and with said axis of said light transmission body.

5. A laser device as claimed in claim 3, wherein said mounting means includes a rectangular outer wall which is substantially coaxial with said active region and said light transmission body.

6. A laser device as claimed in claim 1, wherein said light focusing portion is coextensive with said light transmission body.

7. A laser device as claimed in claim 1, wherein said light focusing portion is disposed in a part of said transmission body nearest to said laser element.

8. A laser device as claimed in claim 1, wherein said light focusing portion is disposed in said light transmission body in an area spaced from said laser element.

9. A laser device as claimed in claim 1, wherein said light transmission body is of circular cross section.

10. A laser device as claimed in claim 1, wherein said light transmission body is of rectangular cross section.

11. A laser device as claimed in claim 1, wherein said outer surface of said light transmission body is cylindrical.

12. A laser device as claimed in claim 1, wherein said outer surface of said light transmission body is spherical.

13. A laser device as claimed in claim 1, wherein said second reflecting means includes a layer of light reflecting material disposed on the outer surface of said transmission body.

14. A laser device as claimed in claim 1, wherein said second reflecting means includes a strip like layer of reflecting material disposed on said outer surface of said transmission body along an axis which is substantially perpendicular to the direction of elongation of said active region of said element.

15. A laser device as claimed in claim 1, in which the refractive index distribution within said focusing portion varies parabolically along any plane passing through the axis of said portion with a maximum value at the axis of the focusing portion.

16. A laser device as claimed in claim 1, in which the refractive index distribution within said focusing portion varies parabolically in a plane perpendicular to the direction of elongation of said active region of said element with a maximum value at the axis of said focusing portion and said refractive index is a constant value in a plane parallel to the direction of elongation of said active region of said element.

17. A laser device as claimed in claim 1, in which said focusing portion includes at least two sections and in which the refractive index distribution is different in each of said sections.

18. A laser device for generating a light beam of predetermined cross section along a given path has a first and a second opposed end surfaces which are substantially perpendicular to and arranged so that they intersect said given path, including:

reflecting means disposed on each of said end surfaces within said path to reflect said light beam;

a semiconductor element, said element including a longitudinally extending laser active region oriented to generate said beam along said path, the cross section of said region being elongated in a direction substantially transverse to the direction of said path and said region having a substantially central axis;

a light transmission structure including at least two bodies having axes which are collinear with said axis of said laser active region, one of said bodies being disposed adjacent to each end of said laser active region;

each of said light transmission bodies including a focusing portion arranged along the axis of said body, and each of said focusing portions having a refractive index distribution in which said refractive index is a maximum along said axis of said body and decreases parabolically in at least one plane intersecting said axis.

* * * * *